United States Patent
Nakajima et al.

(10) Patent No.: US 8,941,318 B2
(45) Date of Patent: Jan. 27, 2015

(54) POWER SUPPLY FOR ILLUMINATION AND LUMINAIRE

(75) Inventors: Hiromichi Nakajima, Kanagawa-ken (JP); Toshio Tsuji, Kanagawa-ken (JP); Masahiko Kamata, Kanagawa-ken (JP)

(73) Assignee: Toshiba Lighting & Technology Corporation, Kanagawa (JP)

( * ) Notice: Subject to any disclaimer, the term of this patent is extended or adjusted under 35 U.S.C. 154(b) by 285 days.

(21) Appl. No.: 13/480,790

(22) Filed: May 25, 2012

(65) Prior Publication Data

US 2013/0207554 A1    Aug. 15, 2013

(30) Foreign Application Priority Data

Feb. 13, 2012    (JP) .................. 2012-028386

(51) Int. Cl.
*H05B 37/02*    (2006.01)

(52) U.S. Cl.
USPC ........................................ 315/291

(58) Field of Classification Search
USPC ............. 315/160–164, 185 R, 186, 191, 192, 315/200 R, 209 R, 246, 290–291, 312
See application file for complete search history.

(56) References Cited

U.S. PATENT DOCUMENTS

| | | |
|---|---|---|
| 2003/0090216 A1 | 5/2003 | Nerone |
| 2007/0030138 A1* | 2/2007 | Ito et al. ........................ 340/467 |
| 2009/0066262 A1* | 3/2009 | Tateishi et al. ................ 315/291 |
| 2010/0039047 A1* | 2/2010 | Fukui ............................. 315/297 |
| 2011/0254524 A1* | 10/2011 | Ishii ............................... 323/282 |
| 2011/0260642 A1* | 10/2011 | Huang ........................... 315/294 |
| 2012/0019714 A1* | 1/2012 | Hiramatu et al. ............. 348/370 |

FOREIGN PATENT DOCUMENTS

| | | |
|---|---|---|
| AU | 2008200904 | 3/2009 |
| CN | 101673957 A | 3/2010 |
| CN | 101969266 A | 2/2011 |

OTHER PUBLICATIONS

European Search Report issued May 15, 2013 for corresponding European Patent Appln. No. 12170136.1-1802, 6 pages.
Chinese Office Action dated Jul. 31, 2014 for Application No. 201210174915.

* cited by examiner

*Primary Examiner* — Minh D A
(74) *Attorney, Agent, or Firm* — Patterson & Sheridan LLP

(57)    ABSTRACT

According to one embodiment, a luminaire includes a light-emitting module, a first lighting circuit and a back-flow preventing circuit. The light-emitting module includes a light-emitting element and a capacitive element. The first lighting circuit is supplied with power from the first power supply and is configured to activate the light-emitting element. The back-flow preventing circuit interrupts current flowing in a direction from the capacitive element to the first lighting circuit.

18 Claims, 2 Drawing Sheets

POWER SUPPLY FOR ILLUMINATION AND LUMINAIRE

CROSS-REFERENCE TO RELATED APPLICATIONS

This application is based upon and claims the benefit of priority from the prior Japanese Patent Application No. 2012-028386, filed on Feb. 13, 2012; the entire contents of which are incorporated herein by reference.

FIELD

Embodiments described herein relate generally to a power supply for illumination, a luminaire and a method of supplying power.

BACKGROUND

In recent years, in a luminaire, as an illumination light source, an incandescent lamp or a fluorescent lamp is being replaced by an energy-saving and long-lived light source, for example, a light-emitting diode (LED). Besides, a new illumination light source such as, for example, an EL (Electro-Luminescence) or an organic light-emitting diode (OLED), is also developed. A luminaire is known in which the light-emitting element is connected with a capacitive element such as a capacitor and is stably lit without flickering. In the luminaire as stated above, when the power supply is changed over as in, for example, an emergency lamp, there is a possibility that current flows back from the capacitor to the power supply side, and a power supply circuit is erroneously operated.

An exemplary embodiment described herein provides a luminaire which does not erroneously operate even when a capacitive element is connected as a load.

DETAILED DESCRIPTION

Figure 1:
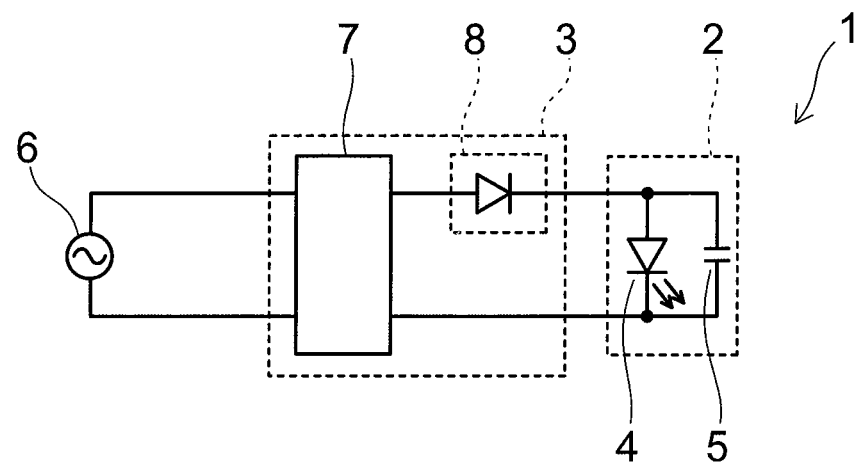
FIG. 1 is a circuit view exemplifying a luminaire including a power supply circuit of a first embodiment.

In general, according to one embodiment, a luminaire includes a light-emitting module, a first lighting circuit and a back-flow preventing circuit. The light-emitting module includes a light-emitting element and a capacitive element. The first lighting circuit is supplied with power from the first power supply and configured to activate the light-emitting element. The back-flow preventing circuit interrupts current flowing in a direction from the capacitive element to the first lighting circuit.

According to another embodiment, a power supply for illumination includes a first lighting circuit and a back-flow preventing circuit. The first lighting circuit converts and outputs power supplied from the first power supply. The back-flow preventing circuit is connected to the first lighting circuit and configured to interrupt current flowing back to an output side of the first lighting circuit from a light-emitting module that is to be connected thereto.

Hereinafter, embodiments will be described in detail with reference to the drawings. Incidentally, in the present specification and the drawings, the same component as one described with reference to a previous drawing is denoted by the same reference numeral and the detailed description thereof will be appropriately omitted.

First Embodiment

FIG. 1 is a circuit view exemplifying a luminaire including a power supply circuit of a first embodiment.

As shown in FIG. 1, a luminaire 1 includes a light-emitting module 2 and a power supply circuit 3 to light the light-emitting module 2.

The light-emitting module 2 includes a light-emitting element 4 and a capacitive element 5 connected in parallel to the light-emitting element 4. The light-emitting element 4 includes, for example, an LED, and is supplied with power from the power supply circuit 3 and is lit. The capacitive element 5 is, for example, a capacitor, and is provided in the vicinity of the light-emitting element 4. That is, the capacitive element 5 is provided to be closer to the light-emitting element 4 than the power supply circuit 3. The capacitive element 5 removes a noise from the power supply circuit 3 or the like and suppresses a fluctuation of voltage to prevent flickering.

The power supply circuit 3 converts power supplied from a first power supply 6 and supplies the power to the light-emitting module 2. The first power supply 6 is an AC power supply such as commercial power supply or a DC power supply such as a secondary battery.

The power supply circuit 3 includes a first lighting circuit 7 to convert and output the power supplied from the first power supply 6, and a back-flow preventing circuit 8 connected between the first lighting circuit 7 and the light-emitting module 2.

The first lighting circuit 7 includes a switching power supply such as, for example, a DC-DC converter, and converts the power supply voltage and power supply current of the first power supply 6 to a voltage and current suitable for the light-emitting element 4.

The back-flow preventing circuit 8 is a diode whose forward direction is from the first lighting circuit 7 to the light-emitting module 2, and interrupts current flowing in a direction from the light-emitting module 2 to the first lighting circuit 7.

When the power is supplied from the first power supply 6 and the first lighting circuit 7 lights the light-emitting module 2, the capacitive element 5 is charged with a forward voltage of the light-emitting element 4. Thus, if the supply of the power to the first lighting circuit 7 is stopped by, for example, an instantaneous interruption of the first power supply 6, the output of the first lighting circuit 7 is reduced, and a state occurs in which a high voltage is applied from the light-emitting module 2 side.

At this time, for example, if the back-flow preventing circuit 8 is not provided, current flows in a direction from the capacitive element 5 to the first lighting circuit 7, and there is a possibility that the first lighting circuit 7 erroneously operates and is further damaged.

On the other hand, in this embodiment, since the back-flow preventing circuit 8 interrupts the current in the direction from the capacitive element 5 to the first lighting circuit 7, the first lighting circuit 7 does not erroneously operate and is not damaged.

Second Embodiment

Figure 2:
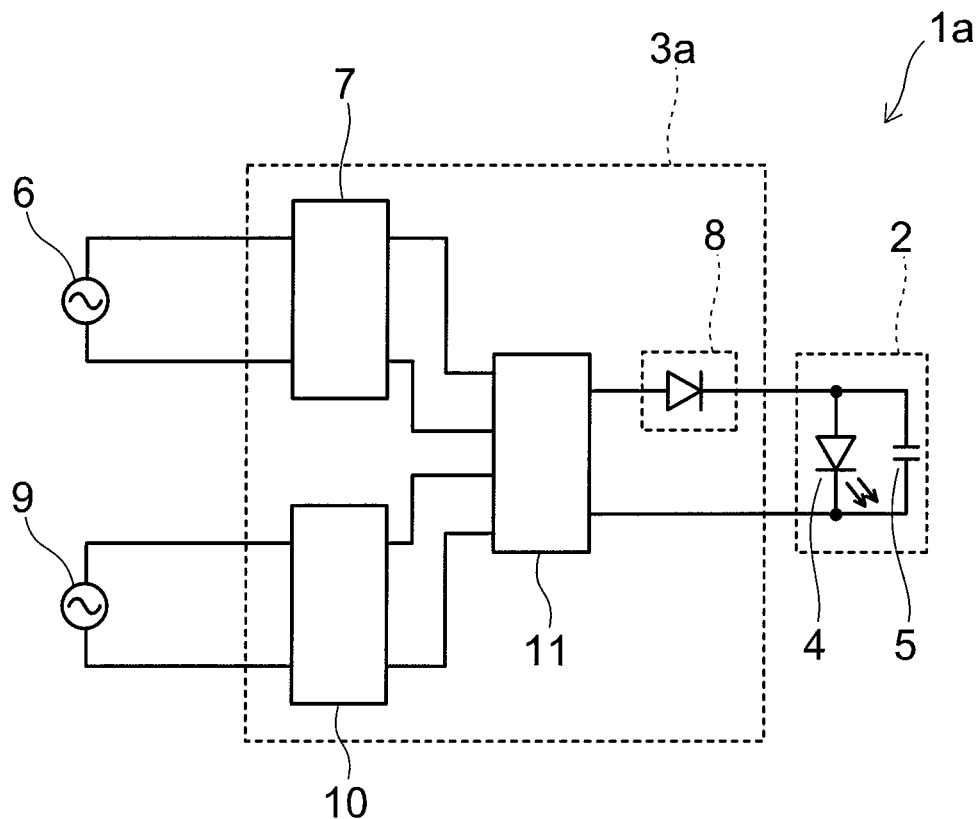
FIG. 2 is a circuit view exemplifying a luminaire including a power supply circuit of a second embodiment.

FIG. 2 is a circuit view exemplifying a luminaire including a power supply circuit of a second embodiment.

A luminaire 1a of the second embodiment is different from the luminaire 1 of the first embodiment in the structure of the power supply circuit 3. That is, the luminaire 1a includes a power supply circuit 3a in which a second lighting circuit 10 and a control circuit 11 are added to the power supply circuit 3. The structure of the luminaire 1a other than this is the same as the structure of the luminaire 1.

The second lighting circuit 10 includes a switching power supply such as, for example, a DC-DC converter, and converts the power supply voltage and power supply current of a second power supply 9 to a voltage and current suitable for a light-emitting element 4. The second power supply 9 is an AC power supply such as a commercial power supply or a DC power supply such as a secondary battery. Incidentally, a first power supply 6 and the second power supply 9 are power supplies of different systems, and for example, one of the power supplies may be a power supply for normal operation, and the other may be a back-up power supply for emergency.

The control circuit 11 selects one of the first lighting circuit 7 and the second lighting circuit 10, and lights the light-emitting element 4 through a back-flow preventing circuit 8. The control circuit 11 is, for example, a relay. When the output of the first lighting circuit 7 is a specified value or more, the control circuit 11 selects the first lighting circuit 7 and electrically connects the first lighting circuit 7 to the light-emitting module 2. Besides, when the output of the first lighting circuit 7 becomes lower than the specified value, the control circuit 11 selects the second lighting circuit 10 and electrically connects the second lighting circuit 10 to the light-emitting module 2. Here, the specified value is a voltage, a current or a power required to light the light-emitting element 4. For example, when the output of the first lighting circuit 7 becomes lower than the specified value due to abnormality of at least one of the first power supply 6 and the first lighting circuit 7, the output of the second lighting circuit 10 is selected and the light-emitting element 4 is lit.

In this embodiment, since the first power supply 6 and the second power supply 9 of different systems can be changed over as the power supply to be supplied to the light-emitting module 2, if the luminaire is used as, for example, an emergency lamp, normal lighting and emergency lighting can be performed by the one light-emitting module 2.

Besides, in this embodiment, since the first lighting circuit 7 or the second lighting circuit 10 selected by the control circuit 11 lights the light-emitting module 2 through the back-flow preventing circuit 8, current in a direction from the capacitive element 5 to the control circuit 11 is interrupted. For example, when the control circuit 11 changes the selection from the second lighting circuit 10 to the first lighting circuit 7, or changes the selection from the first lighting circuit 7 to the second lighting circuit 10, current in the direction from the capacitive element 5 to the first lighting circuit 7 and the second lighting circuit 10 is interrupted. As a result, the first lighting circuit 7 and the second lighting circuit 10 do not erroneously operate and are not damaged.

The effects of this embodiment other than the above are the same as the effects of the first embodiment.

Third Embodiment

Figure 3:
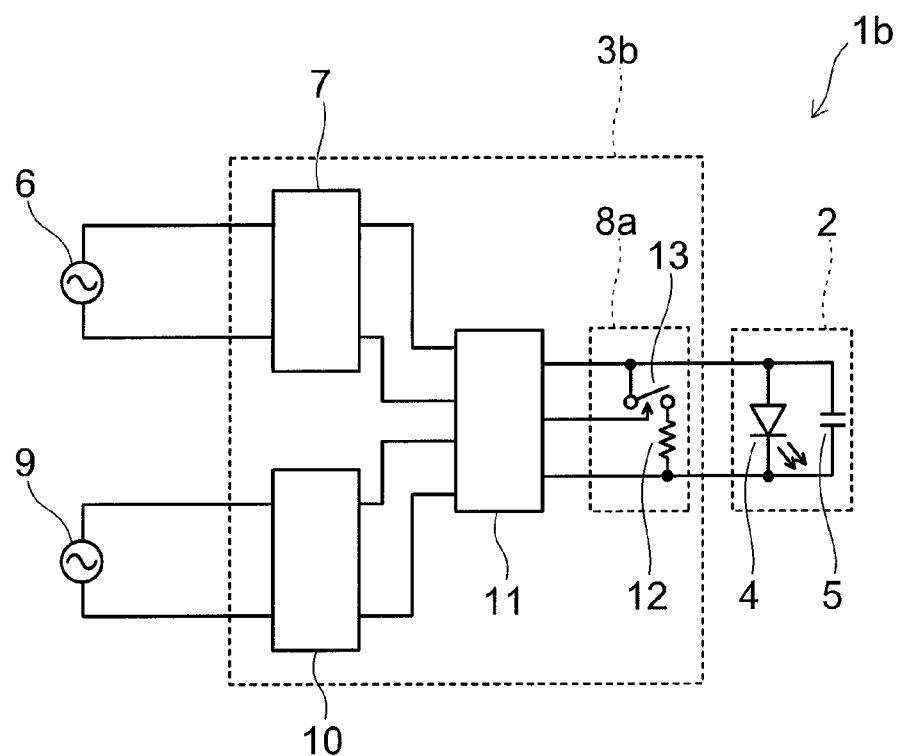
FIG. 3 is a circuit view exemplifying a luminaire including a power supply circuit of a third embodiment.

FIG. 3 is a circuit view exemplifying a luminaire including a power supply circuit of a third embodiment.

A luminaire 1b of a third embodiment is different from the luminaire 1a of the second embodiment in the structure of the power supply circuit 3a. That is, the luminaire 1b includes a power supply circuit 3b in which the back-flow preventing circuit 8 of the power supply circuit 3a is replaced by a back-flow preventing circuit 8a. The structure of the luminaire 1b other than this is the same as the luminaire 1a.

The back-flow preventing circuit 8a includes a discharge resistance 12 and a switch 13. The discharge resistance 12 is connected to a light-emitting module 2 through the switch 13. That is, the discharge resistance 12 and the switch 13 are connected in series to both ends of a light-emitting element 4 and a capacitive element 5. The switch 13 is controlled to be on or off by a control circuit 11. When changing the selection between the first lighting circuit 7 and the second lighting circuit 10, the control circuit 11 turns on the switch 13 to discharge the electric charge of the capacitive element 5. Thereafter, the control circuit turns off the switch 13 to disconnect the discharge resistance 12, and then, changes the selection between the first lighting circuit 7 and the second lighting circuit 10, and lights the light-emitting element 4.

In this embodiment, when the selection is changed from the first lighting circuit 7 to the second lighting circuit 10 or from the second lighting circuit 10 to the first lighting circuit 7, the electric charge of the capacitive element 5 is discharged. As a result, since current does not flow back in any directions from the capacitive element 5 to the first lighting circuit 7 and the second lighting circuit 10, the first lighting circuit 7 and the second lighting circuit 10 do not erroneously operate and are not damaged.

The effects of this embodiment other than the above are the same as the effects of the second embodiment.

Incidentally, similarly to the back-flow preventing circuit 8 in the second embodiment, the back-flow preventing circuit 8a in this embodiment may include a diode connected between the control circuit 11 and the light-emitting module 2.

Fourth Embodiment

Figure 4:
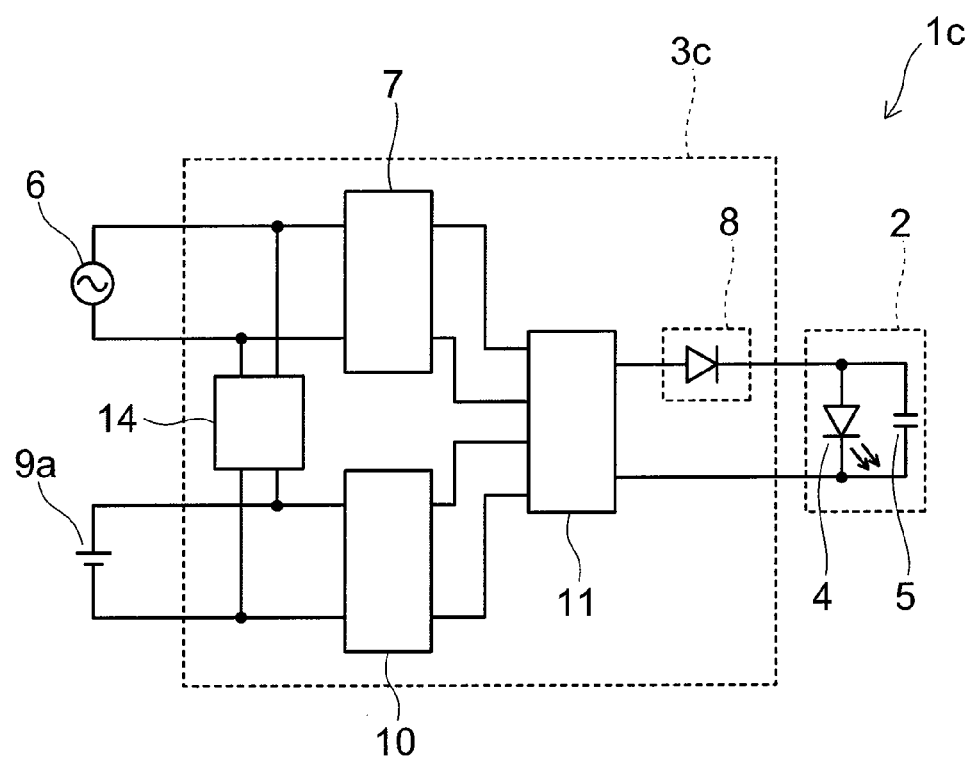
FIG. 4 is a circuit view exemplifying a luminaire including a power supply circuit of a fourth embodiment.

FIG. 4 is a circuit view exemplifying a luminaire including a power supply circuit of a fourth embodiment.

A luminaire 1c of the fourth embodiment is different from the luminaire 1a of the second embodiment in the structure of the power supply circuit 3a. That is, the luminaire 1c includes a power supply circuit 3c in which a charging circuit 14 is added to the power supply circuit 3a, and a secondary battery is connected as a second power supply 9a. The structure of the luminaire 1c other than this is the same as the structure of the luminaire 1a.

The charging circuit 14 charges the second power supply 9a with power supplied from a first power supply 6. When a first lighting circuit 7 is selected, a control circuit 11 operates the charging circuit 14 to charge the second power supply 9a. When a second lighting circuit 10 is selected, the control circuit stops the operation of the charging circuit 14. The first power supply 6 is an AC power supply such as a commercial power supply and is a power supply for normal operation. The second power supply 9a is a DC power supply such as a secondary battery and is a back-up power supply for emergency.

In this embodiment, since the second power supply 9a is charged with the power supplied from the first power supply 6 at the time of normal operation, the power supply voltage of the second power supply 9a can be maintained at a specified value or higher, and for example, even at the time of emergency, lighting can be certainly performed.

Besides, in this embodiment, although the first power supply 6 and the second power supply 9a are connected through the charging circuit 14, current in a direction from a capacitive element 5 to the control circuit 11 is interrupted. As a result, since current does not flow back in any directions from the capacitive element 5 to the first lighting circuit 7 and the second lighting circuit 10, current does not flow back to the first power supply 6 and the second power supply 9a.

The effects of this embodiment other than the above are the same as the effects of the second embodiment.

Although the embodiments are described with reference to the specific examples, no limitation is made to those and various modifications can be carrier out.

For example, the light-emitting element 4 is not limited to the LED and may be an OLED or the like. Besides, plural light-emitting elements 4 may be connected in series to or in parallel to each other in the light-emitting module 2 according to a desired light output. When the plural light-emitting elements 4 are used, the capacitive element 5 can be connected in parallel to each of the light-emitting elements 4. Further, the capacitive element 5 may be connected to both ends of the plural light-emitting elements 4 connected in series to each other.

Besides, for example, the back-flow preventing circuit 8 or 8a may include an inductive element to suppress an abrupt current change, for example, an inductor.

Besides, for example, in the luminaire 1, 1a, 1b or 1c, the light-emitting module 2 may be detachably provided. At that time, a connection terminal is provided between the power supply circuit 3, 3a, 3b or 3c and the light-emitting module 2. Specifically, the power supply circuit 3, 3a, 3b or 3c is provided with a power supply side terminal, and the light-emitting module 2 is provided with a light source side terminal.

Besides, the back-flow preventing circuit 8 or 8a may be provided in the light-emitting module 2.

Although the exemplary embodiments have been described, these embodiments have been presented by way of example only, and are not intended to limit the scope of the invention. Indeed, these novel embodiments can be carried out in a variety of other forms, and various omissions, substitutions and changes can be made within the scope not departing from the gist of the invention. These embodiments and modifications thereof fall within the scope and the gist of the invention and fall within the scope of the invention recited in the claims and their equivalents.

What is claimed is:

1. A power supply for illumination, comprising:
   a first lighting circuit to convert and output power supplied from a first power supply;
   a back-flow preventing circuit that is connected to the first lighting circuit and configured to interrupt a current flowing back to an output side of the first lighting circuit from a light-emitting module that is to be connected thereto;
   a second lighting circuit to convert and output power supplied from a second power supply; and
   a control circuit that selects one of the first lighting circuit and the second lighting circuit to output power to the light-emitting module.

2. The power supply of claim 1, wherein the control circuit selects the first lighting circuit when an output of the first lighting circuit is a specified value or higher, and the control circuit selects the second lighting circuit when the output of the first lighting circuit is lower than the specified value.

3. The power supply of claim 1, wherein the second power supply is of a type that is different from that of the first power supply.

4. The power supply of claim 3, wherein the first power supply is an AC power supply, and the second power supply is a secondary battery.

5. The power supply of claim 4, further comprising a charging circuit to charge the second power supply, wherein the control circuit operates the charging circuit when the first lighting circuit is selected, and the control circuit stops the charging circuit when the second lighting circuit is selected.

6. The power supply of claim 1, wherein the back-flow preventing circuit includes a discharge circuit to discharge an electric charge accumulated at the output side.

7. The power supply of claim 6, wherein the discharge circuit includes:
   a discharge resistance; and
   a switch that is connected in series to the discharge resistance and is controlled by the control circuit.

8. A luminaire comprising:
   a light-emitting module including a light-emitting element and a capacitive element;
   a first lighting circuit that is supplied with power from a first power supply and configured to activate the light-emitting element;
   a back-flow preventing circuit that interrupts a current flowing in a direction from the capacitive element to the first lighting circuit
   a second lighting circuit that is supplied with power from a second power supply and configured to activate the light-emitting element; and
   a control circuit that selects one of the first lighting circuit and the second lighting circuit to activate the light-emitting element.

9. The luminaire of claim 8, wherein the control circuit selects the first lighting circuit when an output of the first lighting circuit is a specified value or higher, and the control circuit selects the second lighting circuit when the output of the first lighting circuit is lower than the specified value.

10. The luminaire of claim 8, wherein the second power supply is of a type that is different from that of the first power supply.

11. The luminaire of claim 8, further comprising a charging circuit to charge the second power supply, wherein the control circuit operates the charging circuit when the first lighting circuit is selected, and the control circuit stops the charging circuit when the second lighting circuit is selected.

12. The luminaire of claim 8, wherein the back-flow preventing circuit includes a discharge circuit to discharge an electric charge accumulated in the capacitive element.

13. The luminaire of claim 12, wherein the discharge circuit includes:
   a discharge resistance; and
   a switch that is connected in series to the discharge resistance and is controlled by the control circuit.

14. A method of supplying power to a light-emitting module, comprising:
   using a control circuit to select one of a first power converter and a second power converter as a power source for the light-emitting module; and
   supplying power from the power source to the light-emitting module through a back-flow preventing circuit,
   wherein the first power converter is coupled to a first power supply and the second power converter is coupled to a second power supply, and the back-flow preventing circuit is connected to the first power converter and is configured to interrupt a current flowing back to an output side of the first power converter from the light-emitting module that is to be connected thereto.

15. The method of claim 14, wherein the first and second power supplies are of different types.

16. The method of claim 14, wherein the first power supply is an AC power supply and the second power supply is a DC power supply.

17. The method of claim 16, further comprising:
charging the DC power supply when the first power converter is selected as the power source for the light-emitting module.

18. The method of claim 14, wherein the light-emitting module includes a capacitor and the back-flow preventing circuit includes a diode that is arranged to block a discharge current from the capacitor.

\* \* \* \* \*